United States Patent [19]

Lautenberger

[11] 3,956,162

[45] May 11, 1976

[54] THIXOTROPIC CLEANING COMPOSITION CONTAINING PARTICULATE RESINS AND FUMED SILICA

[75] Inventor: William Jacob Lautenberger, Wilmington, Del.

[73] Assignee: E. I. Du Pont de Nemours and Company, Wilmington, Del.

[22] Filed: June 15, 1973

[21] Appl. No.: 370,284

[52] U.S. Cl. .................................... 252/162; 8/142; 252/88; 252/154; 252/167; 252/168; 252/170

[51] Int. Cl.[2] ....................... C09K 3/22; C11D 3/44

[58] Field of Search ........... 252/154, 167, 169, 166, 252/163, 164, 165, 171, 172, 173, 88, 168, 162; 8/142

[56] References Cited

UNITED STATES PATENTS

| | | | |
|---|---|---|---|
| 2,901,383 | 8/1959 | Lebsanft | 252/163 |
| 3,351,560 | 9/1967 | Brown | 252/172 |
| 3,630,919 | 12/1971 | Sheaffer | 252/88 |
| 3,748,268 | 7/1973 | Loudas | 252/163 |

FOREIGN PATENTS OR APPLICATIONS

| | | | |
|---|---|---|---|
| 1,114,697 | 5/1968 | United Kingdom | 252/88 |
| 2,015,972 | 4/1970 | France | |

*Primary Examiner*—Samuel W. Engle
*Assistant Examiner*—Ralph Palo

[57] ABSTRACT

A cleaning composition in the form of a thixotropic paste which consists essentially of finely divided insoluble particulate matter, water, a petroleum distillate boiling from 150° to 250°C., a hydrocarbon or halogenated hydrocarbon liquid boiling from about 35° to 75°C., and an emulsifying surfactant.

7 Claims, No Drawings

THIXOTROPIC CLEANING COMPOSITION CONTAINING PARTICULATE RESINS AND FUMED SILICA

BACKGROUND OF THE INVENTION

1. Field of the Invention

This invention relates to cleaning compositions and more particularly is directed to such compositions having a thixotropic paste-like nature, which can be advantageously employed to clean non-horizontal surfaces, especially vertical surfaces of textile materials.

2. Prior Art

Cleaners have utilized a number of different chemical and physical actions in performing their function. Dissolving the soil, abrading it from the surface to be cleaned, and floating it away from the soiled surface by application of a surfactant, are all commonly used mechanisms for removing soil from a substrate. Paste-like cleaners are particularly useful for cleaning vertical or other non-horizontal surfaces where liquid material might run down, streak, and even spread the soil to another part of the surface. Thixotropic gel cleaners have been disclosed for cleaning metal surfaces, but these cleaners incorporate acids to dissolve corrosion products on the metal surfaces. Paste type cleaners such as those disclosed in U.S. Pat. No. 2,728,729 are also available for cleaning wall paper and painted walls; however, these cleaners are not thixotropic but are cohesive instead, and resist crumbling in use.

More recently dry powder cleaners have been developed wherein the cleaning mechanism depends to a large extent on the transfer of soil from its lodging on a substrate to the surface of porous particles through the agency of a solvent or solvents and a mechanical agitating action. Such powders are disclosed in copending application Ser. No. 209,402 filed Dec. 17, 1971, now abandoned. Evaporation of the solvent or a substantial part of it leaves dry particles containing the soil which can be removed by suction or by brushing. Powdered cleaning compositions, while useful on horizontal surfaces such as carpets, cannot be used conveniently on vertical surfaces such as drapes, stair risers, or carpeted walls because they do not adhere sufficiently, tending to fall off the surface before their solvents can penetrate the stained surface and exert their cleaning function. This invention is directed to a composition by which this cleaning mechanism can be applied to vertical or other non-horizontal surfaces without the disadvantages of prior art cleaning compositions.

SUMMARY OF THE INVENTION

In summary, this invention is directed to a thixotropic cleaning paste consisting essentially of 1. 10 to 40 parts of insoluble particulate matter having a particle size of from 10 to 105 microns and an oil value of at least 90;
2. 60 to 90 parts of a liquid component comprising
   a. 5 to 20 parts of water,
   b. 1 to 10 parts of a petroleum distillate highboiler having a boiling point between about 150° and 250°C., and
   c. 40 to 70 parts of a hydrocarbon or halogenated hydrocarbon low-boiling solvent having a boiling point of from about 35° to 75°C;
3. 0.1 to 2.0 parts of a powdered solid thixotropic agent having a particle size of from about 0.007 to 0.05 micron;

4. 0.01 to 5.0 parts of an emulsifying surfactant having a Hydrophile-Lipophile balance greater than 8.0; and
5. 0.0 to 7.0 parts of other solvent-inhibiting agents.

Preferred among the cleaning compositions of this invention are those which consist essentially of 1. 15 to 20 parts of insoluble particles of synthetic organic polymer;
2. 70 to 80 parts of a liquid component consisting essentially of
   a. 9 to 14 parts of water,
   b. 4 to 6 parts of a petroleum distillate having a boiling point between about 170° and 215°C., and
   c. 55 to 65 parts of a solvent selected from among methyl chloroform and perhalogenated ethanes containing both chlorine and fluorine atoms and having a boiling point between about 35° and 75°C.;
3. 0.5 to 1.5 parts of fumed silica thixotropic agent;
4. 0.1 to 1.0 part of emulsifying surfactant having a Hydrophile-Lipophile balance greater than 8.0;
5. 1 to 3 parts of freeze-depressant solvents; and
6. 0.5 to 4 parts of other inhibitor solvents.

DESCRIPTION OF THE INVENTION

Cleaning compositions of this invention contain six essential ingredients: (1) solid porous particles; (2) water; (3) a low boiling solvent; (4) a high boiling solvent; (5) an emulsifying surfactant; and (6) an agent promoting thixotropicity. Numbers 2, 3, and 4 together form the liquid component of the composition.

The composition combining these components must have a paste-like consistency enabling it to be applied to a surface and distributed by a spatula, a brush or even by hand. For certain purposes a stiffer or a thinner paste may be desired, and the proportion of particulate matter and fluid can be adjusted to this end. Within the fluid component the proportion of water and non-aqueous liquid can be adjusted to suit the requirements indicated by the type of soil which must be removed. Where the soil is mainly water soluble a larger proportion of water is used. With soils of oily nature a larger proportion of high and low boiling organic solvents are used. The other components are essential to attain and preserve the physical form of the composition, but do not contribute significantly to its cleaning power.

In use, soil is removed from the surface of a substrate by dissolution in the water or organic solvent components of the composition, the dissolution being aided by the agitation, frictional and abrasive action with which the material is applied to the substrate. The thixotropic, fluid nature of the composition allows it to be easily and efficiently distributed over and through a substrate to effectively contact fine fibers, threads, painted surfaces and any other substrate visualized. The soil presumably transfers to the pores and interstices of the porous particles. Meanwhile the volatile 35° to 75°C. boiling solvent is vaporized and removes itself, leaving the major part of the water and higher boiling organic material with the particulate matter in a pseudo dry state. This soil-containing residue can then be removed easily by vacuuming or sweeping.

A number of different materials can be used to prepare particles satisfactory for use in the cleaning compositions of the invention. Synthetic organic polymers are preferred because their properties can be duplicated and controlled. Included among the group of satisfactory polymers are polystyrene, urea-formaldehyde resins, polyvinyl chloride, polyacrylics, polyethylene, polypropylene, and acrylonitrile-butadiene-styrene terpolymer. Most preferred are urea-formaldehyde and polyvinyl chloride.

Methods have been developed for economically putting these polymers into satisfactory physical form for use in the cleaning compositions of this invention. Ordinarily the mere grinding of a material to a preferred size does not produce a satisfactory product. Such comminuted materials ordinarily do not have sufficient porosity to function satisfactorily. However, certain very tough plastics, such as the terpolymer from acrylonitrile, butadiene and styrene, can be ground to particles of adequate porosity because they fracture in a manner which produces particles having many jagged edges and high surface area. Existing techniques of polymerization and insolubilization enable the synthesis of porous particles which are sufficiently porous to take up more than their own weight of oil. Urea and formaldehyde can be polymerized in an acidic aqueous mixture containing a little surfactant to give particles exhibiting a high degree of porosity.

Certain inorganic particles such as diatomaceous earth have sufficiently high porosity to perform satisfactorily also.

Porosity for the purposes of this invention is measured by an oil value as determined according to Method D281 of the American Society for Testing Materials. In this procedure raw linseed oil is gradually added to dry particulate material until there is obtained a stiff, putty-like paste that does not come apart. Oil absorption equals grams of oil divided by grams of particles. The calculation is modified herein as shown below.

$$\text{Oil value} = \frac{\text{grams of oil}}{\text{grams of particles}} \times \text{Sp. G. of particle material} \times 100$$

The cleaning compositions of this invention utilize the porous nature of their particulates to retain significant amounts of the 150° to 250°C. boiling point petroleum distillate after the lower boiling solvent has evaporated. The soil which has been removed from the substrate is held within the pores of the particulate matter along with the petroleum distillate and water, but the particulates are functionally dry and can be easily removed with a vacuum sweeper. Non-porous particulates are not satisfactory, therefore, and particles with oil values below 90 cannot carry sufficient cleaning fluid to do a satisfactory cleaning job.

Porous particles can be obtained in several ways, for instance by adjusting polymerization conditions as shown above for urea-formaldehyde polymers. In another method a polymer can be melt blended in a high torque, low speed mixer, such as a Banbury mixer or a Warner and Pfleiderer mixer, along with a finely divided soluble salt such as sodium chloride, and cooled to solidify; then ground and sieved to isolate particles of desired size. Upon leaching with water the salt is removed, and the particles remaining exhibit a porous character.

Particles of satisfactory porosity and size can be obtained by many other polymerization techniques, such as suspension polymerization or precipitation polymerization with adjustment of conditions to obtain particles of desired character. Polymeric hollow fibers of textile size can be finely chopped to yield particles of satisfactory size and porosity also. Some particles of suitable size and porosity are available commercially, for example the polyvinyl chloride particles employed in Example 7 hereinafter.

In order to function satisfactorily the particles for use in the cleaning compositions of this invention must exhibit an oil value of at least 90 as defined above. Lower porosity particles do not carry sufficient cleaning fluid. Oil values over 140 are preferred.

Particle size should be between 10 and 150 microns. Larger particles do not penetrate textile material adequately, and use of such particles result in only superficial cleaning at best. Larger particles also have insufficient surface area to absorb a large amount of soil per unit weight of cleaning composition. If the particles are smaller than 10 microns in size, they adhere to the individual fibers and have a delustering or dulling effect on the color of the textile. A small proportion of undersize particles can be tolerated, up to about 2 percent exclusive of the thixotropic agent. The most preferred range of particle size is between 37 and 95 microns.

The water in the composition serves as a solvent for certain types of soil, as for instance, sugar or salt, and also as an agent contributing to the thixotropic character of the paste.

The high boiling solvent of the composition serves as a solvent for fatty, oily soil, and binds all of the soil, soluble or insoluble, to the particulate matter, for which it has affinity. The amount of high boiling solvent employed is insufficient, of itself, to result in a sticky or oily character in the residual particles after the low boiling solvent has evaporated. So long as a sufficiently high ratio of sufficiently porous particles to high boiling solvent is employed, the residual particles which remain on the substrate after evaporation of the low boiling solvent will possess an at least superficially dry character. Petroleum hydrocarbons of the boiling point specified are commercially available and can be handled easily in preparing compositions of the invention.

A preferred high boiling solvent is a petroleum distillate having a boiling range between 170° and 215°C. This commercially available material has very little odor, a flash point (Tag, closed cup) of about 126°F. (52°C.) and has low naphthene content, by virtue of which it has very little solvent action on polystyrene or other polymeric materials from which the particulate matter of the cleaning composition may be made.

The low boiling solvents employed contribute solvent power and also contribute to the desirable paste-like character of the compositions. As they evaporate they presumably transfer dissolved soil to the remaining high boiling solvent and porous particles. While low boiling hydrocarbons offer desirable solvent properties, their use is less desirable than halogenated solvents because of their greater flammability. A preferred low boiling solvent is methyl chloroform. Also preferred are those perhalogenated ethanes containing both chlorine and fluorine substituents such as 1,1,2-trichloro-1,2,2-trifluoroethane and 1,1,1-trichloro-2,2,2-trifluoroethane.

In addition to the principal solvent materials, normally present as high boiling hydrocarbon and low boiling halogenated hydrocarbon types, small amounts, preferably less than 5 percent, of other solvents can be present in the composition to confer ancillary benefits. Methanol, ethylene glycol and the like can be used to prevent freezing of the solvent components. Compounds such as seconary butyl alcohol, tetrahydrofuran and dioxane can be used to inhibit the possible breakdown of methyl chloroform when in contact with metals such as aluminum or zinc.

As an agent promoting thixotropicity there is generally employed fumed silica, which has a very small particle size, about 0.01 to 0.007 micron. While other mineral powders such as alumina and some clays of similarly small particle size also aid the thixotropic property, fumed silica is commercially available and performs its function very satisfactorily.

A number of anionic and non-ionic surfactants perform satisfactorily in the compositions of the invention. Surfactants of these types which have Hydrophile-Lipophile Balance of at least 8 function satisfactorily. These include the alcohol sulfates of $C_{12}$–$C_{18}$ aliphatic alcohols and the salts of these sulfates, the mono- and di-alkyl phosphates of $C_8$–$C_{24}$ aliphatic hydrocarbons, alkaryl sulfonates such as alkyl-naphthalene sulfonates, N-acyl substituted sarcosine salts, $C_{12}$–$C_{24}$ aliphatic alcohol-ethylene oxide addition products and others. These types of surfactant are commercially available. The preferred surfactant is sodium fatty alcohol sulfate, the preferred composition employing a mixture of aliphatic alcohols derived from coconut oil and having a high proportion of lauryl alcohol $C_{12}H_{25}OH$. The product can also be made from synthetic alcohols, employing a mixture of about 60% $C_{12}$ alcohols, 25% $C_{14}$ alcohols and lesser amounts of $C_{10}$ and $C_{16}$ alcohols.

In preparing the cleaning compositions of this invention any procedure which mixes the ingredients efficiently can be employed. Generally all of the ingredients except the porous particles are thoroughly mixed before the mixture is incorporated with the particles. The final mixture should be uniform, and should have a paste-like consistency and thixotropic property which allows it to be spread evenly and easily over textiles or other substrate.

The preferred preparation procedure involves charging water, surfactant and high boiling solvent to a mixing vessel, and mixing to form an emulsion. Low boiling solvent and thixotropic agent are then added and mixed well, and finally the porous particles are added and thoroughly admixed.

Alternatively the fumed silica can first be mixed with the low boiling solvent, then water, surfactant and high boiling solvent added to form an emulsion. Finally the particulate material is added and thoroughly admixed.

In another method of preparation, the particulate matter and fumed silica (dry ingredients) are mixed, then added to the mixture of water, surfactant and high boiling solvent. The low boiling solvent is then added gradually, with vigorous mixing.

The proportion of materials is adjusted so as to provide a product of paste-like consistency when it is at rest. The paste can be applied to vertical surfaces such as drapes, chair backs, carpet stair risers and the like. Upon agitation the thixotropic character is exhibited and the composition is easily spread over the surface to provide contact and cleaning to a relatively broad area.

During the preparation of the composition its consistency can be adjusted by adding more fluid if too thick or more particulate material if too thin.

Stains on textile and other surfaces are removed by applying the cleaning composition and agitating it in contact with the spotted substrate. A bristle brush, sponge, cloth or whatever means is best suited to the substrate can be employed. After from about 5 to 300 seconds of agitation, the residual particles can be removed by vacuuming or merely brushing them away. The compositions are effective in removing spots caused by coffee, glucose syrup, washable ink, grape juice, grease, French dressing, chocolate syrup, mustard, corn oil, motor oil, medicinal paraffin oil (dyed or undyed), used motor oil, felt press ink, peat moss and iron oxide. The composition is particularly effective for removing oily soils; however dry, wet and oily soil are all removed.

The following examples illustrate this invention. Parts and percentages shown in the examples are by weight unless otherwise indicated.

EXAMPLE 1

The following materials were used to prepare a cleaning composition of this invention:

- 17.7 parts of urea-formaldehyde particles having a particle size between 10 and 37 microns (1500–400 mesh), and an oil value of 242.
- 1.2 parts of fumed silica, "Cabosil" EH-5, particle size 0.007 micron to 0.05 micron;
- 11.8 parts of water;
- 5.0 parts of a petroleum distillate boiling between 150°C. and 250°C. — "Arco" odorless solvent;
- 59.0 parts of methyl chloroform;
- 2.5 parts of 1,4-dioxane;
- 0.02 part secondary butyl alcohol;
- 0.02 part tetrahydrofuran;
- 1.9 parts methanol;
- 0.6 part ethylene glycol; and
- 0.3 part surfactant — sodium fatty alcohol sulfate, principally lauryl alcohol sulfate.

The water, petroleum distillate and surfactant were added to a "Hobart" dough mixer and mixed to form an emulsion. The other liquid materials were then added, followed by the fumed silica and finally the urea formaldehyde particles. After thorough mixing, the composition was discharged from the mixer, ready for use. It is used by applying to a soiled substrate and brushing or otherwise agitating for a period of several seconds to several minutes. The residual dry particles are removed by sweeping or with a vacuum cleaner. The cleaning composition is effective for cleaning painted surfaces, for textile surfaces including articles such as drapes, furniture and other irregularly shaped objects.

EXAMPLE 2

The following materials were used to prepare a cleaning composition of this invention:

- 32.7 parts of urea-formaldehyde particles having a particle size between 10 and 37 microns (1500–400 mesh) and an oil value above 90;
- 1.77 parts of the fumed silica of Example 1;
- 17.0 parts of water;
- 7.3 parts of the petroleum distillate of Example 1;
- 41.0 parts of methyl chloroform;
- 0.5 part of surfactant — mixed mono and octyl phosphates, ethoxylated with about 1.8 moles ethylene oxide per mole of phosphate;
- 0.1 part of the surfactant of Example 1; and
- 0.1 part of surfactant — diethylcyclohexylammonium sulfate.

The materials were mixed in the same order and manner as in Example 1. Upon discharge from the mixer the composition was ready for use as a cleaner.

This cleaning composition was used to clean a staircase tread riser of nylon twisted low level sheared beige dyed rug. The paste was spread evenly over the rug surface and brushed in immediately with a stiff bristle brush for about 30 seconds. The rug was allowed to dry for about 5 minutes, and was then vacuumed. Excellent cleaning resulted and the brightness of the dyed material was restored.

EXAMPLE 3

The following materials were used to prepare a cleaning composition of this invention:

17.2 parts of the urea-formaldehyde particles of Example 2;
1.0 part of the fumed silica of Example 1;
8.0 parts of water;
3.4 parts of the petroleum distillate of Example 1;
68.4 parts of methyl chloroform;
0.5 part of ethylene glycol;
1.3 parts of methanol;
0.05 part of surfactant — mixed mono and dioctyl phosphates ethoxylated as in Example 2;
0.1 part of the surfactant of Example 1; and
0.1 part of surfactant — diethylcyclohexylammonium sulfate.

In this preparation, the methyl chloroform was charged to a "Hobart" dough mixer and the fumed silica mixed into it. The surfactants, water and petroleum distillate were then added and mixed to form an emulsion, and finally the particulate material was added and thoroughly admixed. Upon discharge the composition was ready to use as a cleaner.

This cleaning composition was used to clean polypropylene low level loop rug containing spots of kitchen grease. After brushing, drying and vacuuming as in Example 2, the grease spots were completely removed.

The same cleaner and technique were used to clean a nylon upholstered sofa, both vertical and horizontal sections, with excellent results in terms of dirt, stain and dust removal and restoral of the brightness of the dyed material.

EXAMPLE 4

The following materials were used to prepare a cleaning composition of this invention:

20.3 parts of the urea-formaldehyde of Example 2;
1.1 parts of the fumed silica of Example 1;
10.6 parts of water;
4.5 parts of the petroleum distillate of Example 1;
61.0 parts of 1,1,2-trichloro-1,2,2-trifluoroethane;
1.69 parts of methanol;
0.6 part of ethylene glycol;
0.03 part of surfactant — mixed octyl phosphates ethoxylated as in Example 2;
0.06 part of the surfactant of Example 1; and
0.06 part of surfactant — diethylcyclohexylammonium sulfate.

In this preparation the fumed silica and particulate material were dry-mixed, then added to the already mixed water, surfactants and petroleum distillate in the dough mixer. The chlorofluorinated solvent was added slowly to form the final composition. Upon discharge the product was ready for use as a cleaner.

EXAMPLE 5

The following materials were used to prepare a cleaning composition of this invention:

20.6 parts of the urea-formaldehyde particles of Example 2;
1.1 parts of the fumed silica of Example 1;
10.7 parts of water;
4.6 parts of the petroleum distillate of Example 1;
60.4 parts of 1,1,2-trichloroethylene;
1.7 parts of methanol;
0.6 part of ethylene glycol;
Surfactants — same type and quantity as in Example 4.

The order and manner of mixing were the same as in Example 4. When discharged from the mixer, the composition was ready to use as a cleaner.

EXAMPLE 6

The following materials were used to prepare a cleaning composition of this invention:

30.4 parts of diatomaceous earth of average particle size of 15 microns and an oil value of 280;
1.1 parts of the fumed silica of Example 1;
10.3 parts of water;
4.4 parts of the petroleum distillate of Example 1;
53.5 parts of methyl chloroform; and
Surfactants — same type and quantity as in Example 5.

The order and manner of mixing was as in Example 1. When discharged from the mixer the composition was ready to use as a cleaner.

EXAMPLE 7

The following materials were used to prepare a cleaning composition of this invention:

22.2 parts of commercially available polyvinyl chloride particles having a particle size between 10 and 37 microns (1500–400 mesh) and an oil value of 125;
1.2 parts of the fumed silica of Example 1;
11.5 parts of water;
4.9 parts of the petroleum distillate of Example 1;
59.9 parts of methyl chloroform;
0.06 part of the surfactant of Example 1; and
0.165 part of surfactant — mixed octyl phosphates ethoxylated as in Example 2.

The order and manner of mixing were as in Example 1. When discharged from the mixer, the composition was ready to use as a cleaner.

EXAMPLE 8

A suitable kettle was charged successively with 333 parts of water, 68.8 parts of urea, 38.1 parts of formaldehyde (as 37 percent aqueous solution containing about 11 percent methanol as stabilizer) and 1.07 parts of a surfactant consisting essentially of the reaction product of 10 mols ethylene oxide with 1 mole oleyl alcohol. With the temperature at 23°C. there was added 1 part of HCl as 37 percent hydrochloric acid. After agitating the mass for 2 hours, the solid produce was isolated by filtration and washed with water until the wash water was free of acid. The solid was dried at 120° to 125°C. in a vacuum oven.

Particles prepared as above are in finely divided form and normally need not be ground to provide sufficiently fine material. They are sieved to furnish particulates of size between about 10 and 105 microns (1500 to 140 mesh).

Oil value of the sieved particulate product was 127.

I claim:

1. A thixotropic cleaning paste consisting essentially of 1. 10 to 40 parts of insoluble, synthetic, organic, polymeric, particulate matter selected from the group consisting of polystyrene, urea-formaldehyde resins, polyvinyl chloride, polyacrylics, polyethylene, polypropylene, and polyacrylonitrile-butadiene-styrene terpolymer having a particle size of from 10 to 105 microns and an oil value of at least 90;
2. 60 to 90 parts of a liquid component comprising
   a. 5 to 20 parts of water,
   b. 1 to 10 parts of a petroleum distillate high-boiler having a boiling point between about 150° and 250°C., and
   c. 40 to 70 parts of a hydrocarbon or halogenated hydrocarbon low-boiling solvent having a boiling point of from about 35° to 75°C.;
3. 0.1 to 2.0 parts of a powdered solid fumed silica thixotropic agent having a particle size of from about 0.007 to 0.05 micron;
4. 0.01 to 5.0 parts of an emulsifying surfactant selected from anionic and non-ionic surfactants having a Hydrophile-Lipophile balance greater than 8.0; and
5. Up to 7.0 parts of a freeze-depressant solvent selected from the group consisting of methanol, ethylene glycol and their mixtures; and an inhibitor solvent selected from secondary butyl alcohol, tetrahydrofuran, dioxane and their mixtures.

2. A cleaning paste of claim 1 wherein the particulate matter has an oil value of more than 140 and a particle size of from 37 to 105 microns.

3. A cleaning paste of claim 1 wherein the petroleum distillate has a boiling point between about 170° and 215°C.

4. A cleaning paste of claim 1 wherein the low-boiling solvent is methyl chloroform or a perhalogenated ethane containing both chlorine and fluorine substituents.

5. A cleaning paste of claim 2 wherein the petroleum distillate has a boiling point between about 170° and 215°C. and the low-boiling solvent is methyl chloroform or a perhalogenated ethane containing both chlorine and fluorine substituents.

6. A cleaning paste of claim 5 consisting essentially of 1. 15 to 20 parts of the polymer particulate;
2. 70 to 80 parts of a liquid consisting essentially of
   a. 9 to 14 parts of water
   b. 4 to 6 parts of petroleum distillate
   c. 55 to 65 parts of low-boiling solvent;
3. 0.5 to 1.5 parts of fumed silica thixotropic agent;
4. 0.1 to 1.0 part of emulsifying surfactant;
5. 1 to 3 parts of solvent to prevent freezing selected from the group consisting of methanol, ethylene glycol and their mixtures; and
6. 0.5 to 4 parts of solvent to inhibit possible metal-catalyzed decomposition of halogenated solvent, the inhibitor solvent being selected from the group consisting of secondary butyl alcohol, tetrahydrofuran, dioxane and their mixtures.

7. A cleaning paste of claim 6 wherein
the particulate polymer is urea-formaldehyde or polyvinyl chloride; and
the emulsifying surfactant is the salt of a $C_{12}$ to $C_{18}$ aliphatic alcohol sulfate.

* * * * *